July 4, 1933.  J. F. BIRINGER  1,916,749
TURF EDGER
Filed March 19, 1932
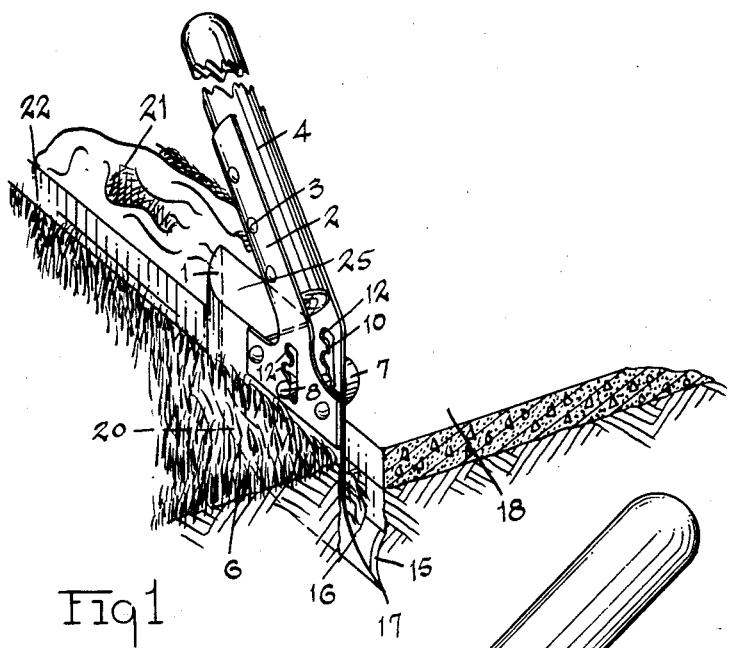
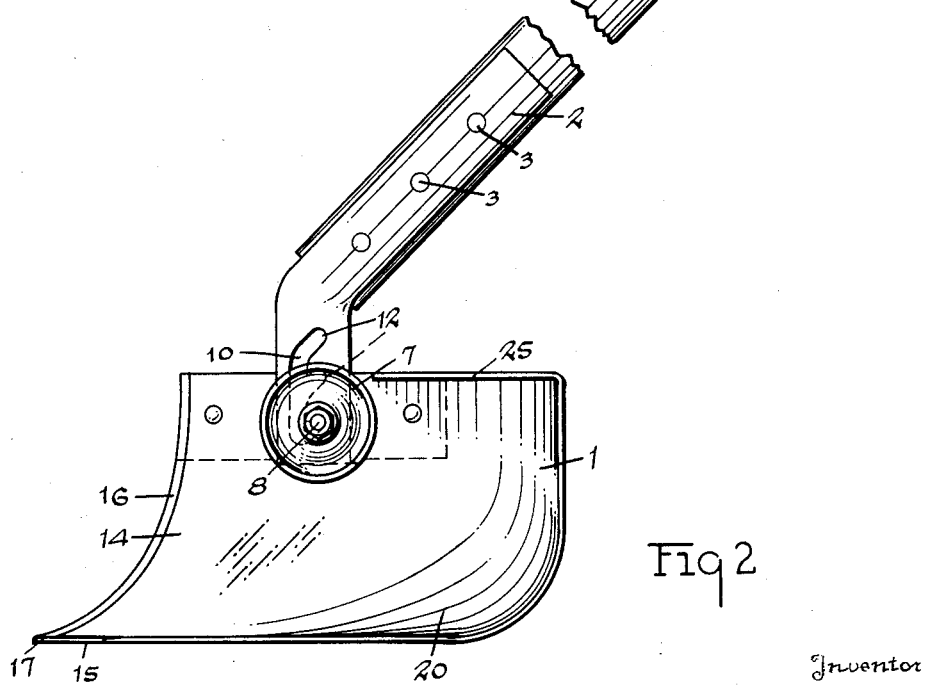
Inventor
Joseph F. Biringer
By Faust F. Crampton
Attorney Patented July 4, 1933

1,916,749

UNITED STATES PATENT OFFICE

JOSEPH F. BIRINGER, OF TOLEDO, OHIO

TURF EDGER

Application filed March 19, 1932. Serial No. 599,883.

My invention has for its object to provide a turf edger tool having means for readily adjusting the tool to vary the depth of the edging groove formed by the tool in the turf.

The invention has for its particular object to provide a turf edger tool which has means for deflecting and directing the turf removed by the cutting portion of the tool from the groove and to the edge of the groove, from where it can be easily collected and removed. Another object of the invention is to provide a turf edging tool having means for moving the tool easily over the turf whereby the turf edging may be quickly performed with a minimum outlay of force applied to the tool. Another object of the invention is to provide an efficient turf edging tool of low cost.

The invention consists in other features and advantages which will appear from the following description and upon examination of the drawing. Structures containing the invention may partake of different forms and may be varied in their details and still embody the invention. To illustrate a practical application of the invention I have selected a turf edging tool embodying the invention as an example of the various structures and details thereof that contain the invention and shall describe the selected structure hereinafter, it being understood that variations may be made without departing from the spirit of the invention. The particular structure selected is shown in the accompanying drawing.

Fig. 1 of the accompanying drawing illustrates a perspective view of the turf edging tool chosen for purposes of illustration. Fig. 2 illustrates a side view of the turf edger.

Various tools have been heretofore used for the edging of turf. The objection to many of these tools resides in the amount of labor that must necessarily be expended in order to operate the tool and in the un-uniform results that are obtained. The tool provided by my invention has a scoop which is connected to a handle and is supported on a wheel or roller which may be adjusted with reference to the scoop so as to vary the depth of the groove desired in edging the turf. The wheel or roller is adapted to roll on the walk and prevents the scoop from varying its digging action, thus digging a groove of uniform depth throughout. Thus, the scoop may be lowered to below the turf line where, as is frequently the case, the level of the walk is substantially higher than the level of the turf to be edged. The scoop is provided with a bowl, the walls of which cooperate to deflect and direct the loosened turf to a position of discharge along side of the groove from where it may be easily collected and removed. The scoop is also provided with a share which has curved cutting edges and serves to deflect the scoop about obstructions with which the scoop may meet in performing the turf edging operation.

The particular turf edger selected for purposes of illustration has a scoop 1 which is connected by a pair of brackets 2 and bolts 3 to the handle 4. The scoop may be moved downwardly into the ground by exerting a pressure on the handle 4, thus locating the scoop in position for immediate operation.

In order to guide and support the scoop 1 as it is moved through the turf 6, a wheel 7 is connected to the scoop by a suitable axle member and nut 8. The axle member 8 extends through slots 10 formed in each of the brackets 2. In order to provide for adjustability of the scoop relative to the wheel 7 and therefore to enable the operator to vary the depth into the turf 6 at which the scoop 1 moves, the slots 10 are provided with connecting slots or recesses 12 which extend from the slots 10. The slots 12 are located at an angle to the line of the slots 10 and parallel to the line of the handle 4. The axle member may thus be located in any of the recesses 12 according to the adjustment desired and will be increasingly held in position in the slots 12 as the force applied to the handle to move the scoop increases.

The scoop 1 is provided with a prow or share 14 which has curving sharpened edges 15 and 16 which meet to form an extending point 17 at the lower portion of the scoop. As the edging of turf is commonly performed immediately adjacent to walks, such as the walk 18, which are formed of cement or the like, the scoop is forced along the edge of the walk 18, being supported by the wheel 7 to form a groove 22. The point 17 of the share 14 cooperates with the edge 15 to guide the share and scoop about any adjutting or irremovable obstacles, such as portions of concrete which commonly extend from the bed of the walks.

As the turf is cut by the prow 14 the loosened turf 21 is directed rearwardly towards the bowl 20 of the scoop 1. The bowl 20 has walls which curve upwardly and toward one side of the scoop so as to direct the loosened turf 21 upwardly and to one side of the groove 22, where it is discharged. Preferably, the walls of the bowl 20 are curved so as to direct the loosened turf toward the surface of the walk 18 from whence it can be easily gathered and removed.

In order to prevent the loosened turf 21 from escaping over the top of the bowl 20 and falling back into the groove 22, a top plate 25 is provided over the bowl 20 and operates as a guard cooperating with the walls of the bowl 20 to direct loosened turf toward one side of the groove 22.

Thus, I have provided a simple and efficient tool for turf edging which will operate at the minimum outlay of labor and will efficiently form an edging groove in turf of uniform depth throughout.

I claim:

1. In a turf edging tool, a handle, a pair of curved plates attached to the handle in parallel opposite relation to one another, each of the said pair of plates having corresponding longitudinal slots and a plurality of laterally extending slots leading therefrom, a shaft extending through a selected pair of lateral slots for slidable support therein, a wheel rotatably mounted on one end of the shaft, an L-shaped cutter member secured to one of the parallel plates comprising a vertical blade having a vertical concave undercutting knife edge and a basal horizontal blade having a concave cutting edge receding from the point of juncture with the vertical undercutting edge, an upwardly concave deflector extending from the cutting edges of the L-shaped cutter member and extending vertically to the top of the vertical leg thereof, and a horizontal plate joining the vertical leg of the L-shaped cutter member and the deflector whereby sod cut by the advancing blades is deflected in a direction perpendicular to the face of the vertical leg and aside from the path of the cutting edges.

2. In a turf edging tool, a handle, a pair of curved plates attached in parallel positions to opposite sides of one end of the handle and forming curved extensions to the handle, a pair of corresponding longitudinal slots having a plurality of lateral branching slots formed in each of the said pair of plates, a shaft extending through a selected pair of lateral slots for adjustable support therein, a wheel attached to one end of the shaft, a cutting blade attached to one of the curved extensions of the handle, one edge of the cutting blade having a concave under cutting knife edge formed thereon and another edge having a second concave cutting knife edge extending from the end of the first cutting edge to form a receding prow at the point of juncture of the edges, an ellipsoidal upwardly directed deflector extending from the cutting edges, and a plate extending perpendicular to the parallel slotted plates and joining the deflector and the edge of the cutting blade.

In witness whereof I have hereunto signed my name to this specification.

JOSEPH F. BIRINGER.